United States Patent
Al Ghanmi

(10) Patent No.: US 10,907,759 B2
(45) Date of Patent: Feb. 2, 2021

(54) DISCONNECTABLE FLUID COUPLING

(71) Applicant: Saudi Arabian Oil Company, Dhahran (SA)

(72) Inventor: Abdulrahman H. Al Ghanmi, Yanbu (SA)

(73) Assignee: Saudi Arabian Oil Company, Dhahran (SA)

( * ) Notice: Subject to any disclaimer, the term of this patent is extended or adjusted under 35 U.S.C. 154(b) by 52 days.

(21) Appl. No.: 16/383,242

(22) Filed: Apr. 12, 2019

(65) Prior Publication Data

US 2020/0326022 A1    Oct. 15, 2020

(51) Int. Cl.
*F16L 55/10* (2006.01)
*F16K 1/16* (2006.01)
*F16L 29/02* (2006.01)

(52) U.S. Cl.
CPC ......... *F16L 55/1007* (2013.01); *F16K 1/165* (2013.01); *F16L 29/02* (2013.01); *Y10T 137/1662* (2015.04)

(58) Field of Classification Search
CPC ... F16L 55/1007; F16L 55/1015; F16K 1/165; Y10T 137/1654; Y10T 137/1662
See application file for complete search history.

(56) References Cited

U.S. PATENT DOCUMENTS

| 4,023,584 A | * | 5/1977 | Rogers | F16L 29/007 |
| | | | | 137/68.14 |
| 4,090,524 A | * | 5/1978 | Allread | B64D 37/32 |
| | | | | 137/614.02 |
| 4,119,111 A | * | 10/1978 | Allread | F16L 29/007 |
| | | | | 137/67 |
| 4,127,142 A | * | 11/1978 | Snider | E03B 9/04 |
| | | | | 137/285 |
| 4,289,295 A | * | 9/1981 | Allread | F16L 29/02 |
| | | | | 251/149.2 |

(Continued)

FOREIGN PATENT DOCUMENTS

| EP | 0006278 | 1/1980 | | |
| IT | MI20092146 A1 | * | 6/2011 | ......... F16L 55/1015 |

(Continued)

OTHER PUBLICATIONS

PCT International Search Report and Written Opinion in International Appln. No. PCT/US2020/027434, dated Jun. 22, 2020, 16 pages.

(Continued)

*Primary Examiner* — David Colon-Morales
(74) *Attorney, Agent, or Firm* — Fish & Richardson P.C.

(57) ABSTRACT

A first tubular and a second tubular define a fluid passage. A feather is positioned within the first tubular. The feather is configured to axially translate towards the second tubular and pivot towards a center of the first tubular. The feather includes a hinge on a pivoting end. A first end of a spring is coupled to the feather and a second end of the spring is coupled to the first tubular. The spring is loaded to actuate a movement of the feather between an open position and a closed position. A trigger is positioned between the first tubular and the second tubular to provide an interference with the feather. The interference retains the feather in the open position when the first tubular and second tubular are coupled.

22 Claims, 7 Drawing Sheets

(56) References Cited

U.S. PATENT DOCUMENTS

| | | | |
|---|---|---|---|
| 4,326,555 A * | 4/1982 | Thomson | F16L 55/1015 137/68.15 |
| 4,351,353 A | 9/1982 | Flory et al. | |
| 4,501,287 A * | 2/1985 | Thomson | F16L 23/032 137/68.15 |
| 4,607,710 A * | 8/1986 | Radford | E21B 25/10 175/249 |
| 5,165,439 A * | 11/1992 | Krynicki | F16K 17/40 137/1 |
| 6,260,569 B1 | 7/2001 | Abrahams | |
| 6,546,947 B2 | 4/2003 | Abrams | |
| 8,336,570 B2 | 12/2012 | Cardona | |
| 8,800,586 B2 | 8/2014 | Abrams | |
| 8,998,171 B2 * | 4/2015 | Bormioli | F16L 23/036 251/149.2 |
| 9,341,269 B2 * | 5/2016 | Bormioli | F16K 1/16 |
| 2011/0215564 A1 * | 9/2011 | Abrams | F16L 17/00 285/95 |

FOREIGN PATENT DOCUMENTS

| | | | | |
|---|---|---|---|---|
| WO | WO-8103690 A1 * | 12/1981 | | F16L 23/032 |
| WO | 2012076242 | 6/2012 | | |

OTHER PUBLICATIONS

Arm-Tex [online], "Breakaway Couplers," Arm-Tex.com, available on or before Oct. 7, 2011, retrieved on Nov. 1, 2018, URL <https://www.arm-tex.com/breakaway-couplers.html>, 13 pages.

* cited by examiner

DISCONNECTABLE FLUID COUPLING

TECHNICAL FIELD

This disclosure relates to fluid transfer systems and, more particularly, to fluid couplings.

BACKGROUND

Fluid transfer systems are used to transfer fluids between fluid reservoirs in various applications. A fluid reservoir or tank can be either stationary or mobile. For example, mobile fuel tanks include aircrafts and trucks. One component of such systems is a fluid coupling. Fluid couplings interconnect pipes, hoses, conduits, reservoirs, or a combination of some or all. The function of a fluid coupling is to provide a secure and safe connection to transfer fluids that can be hazardous or flammable. Such couplings can include shearing mechanisms and safety mechanisms to prevent the release of hazardous chemicals during a shearing event. For example, a truck driver driving away from a filling station without disconnecting the fluid transfer system from the truck.

SUMMARY

This disclosure describes technologies relating to disconnectable fluid couplings.

An example implementation of the subject matter described within this disclosure is a fluid coupling with the following features. A first tubular defines at least a first part of a fluid passage. A second tubular is coupled to and aligned with the first tubular. The second tubular defines at least a second part of the fluid passage. A feather is positioned within the first tubular. The feather is configured to axially translate towards the second tubular and pivot towards a center of the first tubular. The feather includes a hinge on a pivoting end. The feather has a round shape on the pivoting end and a pointed shape on an opposite end. A spring has a first end and a second end. The first end is coupled to the feather and the second end is coupled to the first tubular. The spring is loaded to actuate a movement of the feather between an open position and a closed position. A trigger abuts to the feather. The trigger is positioned between the first tubular and the second tubular to provide an interference with the feather. The interference retains the feather in the open position when the first tubular and second tubular are coupled.

Aspects of the example implementation, which can be combined with the example implementation alone or in combination, include the following. The feather is one of multiple feathers, each of the feathers has a groove along an inner surface of the feather.

Aspects of the example implementation, which can be combined with the example implementation alone or in combination, include the following. The trigger is shaped to receive a groove in the feather.

Aspects of the example implementation, which can be combined with the example implementation alone or in combination, include the following. A slider mechanically couples the feather with the spring. The slider is attached to a hinge of the feather on a pivoting end and to the spring on an opposite end. The slider is configured to slide against an inner surface of the first tubular.

Aspects of the example implementation, which can be combined with the example implementation alone or in combination, include the following. The fluid coupling defines at least a portion of a fluid passage between a first reservoir and a second reservoir.

Aspects of the example implementation, which can be combined with the example implementation alone or in combination, include the following. The spring is arranged radially around an inner surface of the first tubular. The first end abuts the feather and directs the feather towards the second tubular. The second end includes a shoulder and is nearer a first reservoir than the second reservoir. The spring is positioned to exert a force on the feather in a direction towards the second tubular.

Aspects of the example implementation, which can be combined with the example implementation alone or in combination, include the following. The first tubular is coupled to the second tubular via shear bolts. The shear bolts have sufficient strength to hold the first tubular and the second tubular together under normal operating conditions. The bolts have a strength to shear under an applied tensile load exceeding a predetermined tensile load.

Aspects of the example implementation, which can be combined with the example implementation alone or in combination, include the following. The first tubular is coupled to the second tubular via shear pins. The shear pins have sufficient strength to hold the first tubular and the second tubular together under normal operating conditions. The pins have a strength to shear under an applied tensile load exceeding a predetermined tensile load.

Aspects of the example implementation, which can be combined with the example implementation alone or in combination, include the following. The first tubular is coupled to the second tubular via magnets. The magnets having sufficient strength to hold the first tubular and the second tubular together under normal operating conditions. The magnets have a strength to separate under a predetermined tensile load.

Aspects of the example implementation, which can be combined with the example implementation alone or in combination, include the following. A guide is positioned in the fluid passage defined by the first tubular and second tubular. The guide has a thin profile attached to an inner surface of the first tubular. The guide is configured to guide the feather from an open position to a closed position. The thin profile of the guide is matched to a groove in the feather.

Aspects of the example implementation, which can be combined with the example implementation alone or in combination, include the following. The open position is when the first tubular is joined with the second tubular. The feather is retained by the trigger to allow fluid flow within the fluid passage during operation.

Aspects of the example implementation, which can be combined with the example implementation alone or in combination, include the following. The spring is loaded to keep the feather abut to the trigger in the open position during operation.

Aspects of the example implementation, which can be combined with the example implementation alone or in combination, include the following. The spring unloads to actuate movement of the feather to a closed position.

Aspects of the example implementation, which can be combined with the example implementation alone or in combination, include the following. The closed position includes the first tubular being released from the second tubular. The feather has translated to block the fluid passage by closing the first tubular.

Aspects of the example implementation, which can be combined with the example implementation alone or in combination, include the following. The spring includes one spring connected to a common ring. The common ring is positioned to transfer a spring force to the feather.

Aspects of the example implementation, which can be combined with the example implementation alone or in combination, include the following. The first tubular is substantially identical to the second tubular. The feather is a first feather. The fluid coupling further includes a second feather positioned within the second tubular. The second feather is configured to axially translate towards the first tubular and pivot towards a center of the second tubular. The second feather has a round shape on a second pivoting end and a pointed shape on a second opposite end. The second feather has a groove along an inner surface of the second feather.

Aspects of the example implementation, which can be combined with the example implementation alone or in combination, include the following. The trigger includes a solid rod.

Aspects of the example implementation, which can be combined with the example implementation alone or in combination, include the following. The feather is cladded by a sealing material.

An example implementation of the subject matter described within this disclosure is a method with the following features. A feather is retained by a trigger in an open position. The open position allows fluid to flow through a fluid passage defined by a first tubular and a second tubular. The first tubular is axially coupled to the second tubular. The first tubular is aligned with the second tubular. The feather is positioned within the first tubular. The first tubular and the second tubular are separable under a pre-determined tensile load. A fluid is flowed from a first reservoir to a second reservoir through the fluid passage. The first tubular is released from the second tubular in response to an applied tensile load exceeding the pre-determined tensile load. The trigger is activated in response to the release of the first tubular from the second tubular. The feather is translated by a loaded spring towards a closed position. The fluid passage is blocked by the feather translating to the closed position.

Aspects of the example implementation, which can be combined with the example implementation alone or in combination, include the following. The feather is retained by the loaded spring in the open position during operation.

Aspects of the example implementation, which can be combined with the example implementation alone or in combination, include the following. In response to releasing the first tubular from the second tubular, the feather is actuated from the open position to the closed position by unloading the loaded spring.

Aspects of the example implementation, which can be combined with the example implementation alone or in combination, include the following. The feather is guided, by a guide, from the open position to the closed position. The guide has a thin profile attached to an inner surface of the first tubular. The thin profile of the guides is matched to a groove in an inner surface of the feather.

An example implementation of the subject matter described within this disclosure is a fluid transfer system with the following features. A first reservoir is configured to retain a fluid. A second reservoir is configured to receive the retained fluid. A fluid coupling defining at least a part of a fluid passage between the first reservoir and second reservoir. The fluid coupling includes a first tubular axially coupled to a second tubular. The first tubular is aligned with the second tubular to define the fluid passage. A feather is positioned within the first tubular. The feather is configured to axially translate towards the second tubular and pivot towards a center of the first tubular. A spring is attached to the feather. The spring is configured to actuate a movement of the feather between an open position and a closed position. A trigger is attached to the feather. The trigger is positioned between the first tubular and the second tubular. The trigger is configured to retain the feather in the open position when the first tubular and second tubular are coupled.

Particular implementations of the subject matter described in this disclosure can be implemented so as to realize one or more of the following advantages. The fluid transfer system of this disclosure prevents the uncontrolled release of fluids in the event of fluid coupling disconnection. This in turn reduces the risk of harming humans and the environment from exposure to fluids that can be dangerous or flammable. Because the fluid coupling is designed to disconnect under a pre-determined tensile load, assets, such as pumps, fittings, and other equipment, are protected from damage resulting from excessive pulling forces. The fluid coupling of this disclosure uses an isolation technique that is mechanically triggered once a pulling force is applied, which eliminates the need for a power source or cable connections. The compact size and design of internal components of the fluid coupling have little or no impact on the flow rate passing through the fluid coupling.

The details of one or more implementations of the subject matter described in this disclosure are set forth in the accompanying drawings and the description. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In fluid transfer systems, fluid release incidents can occur when filling or emptying a fluid reservoir. For example, a fluid release can occur when a portable tanker moves and causes tension to the weakest point in the fluid transfer system. Typically, the mounting tension causes a break or failure in supplying connections and fittings, such as hoses and couplings. Although hoses are commonly used for this type of application due to their flexibility, hoses can be tensioned beyond their strength by the movement of fluid tankers. As a result, hoses or couplings can break and cause an uncontrolled release of the transferred fluid, especially in cases where the transferred fluid is flammable or hazardous, which can lead to safety and environmental losses and operations interruption.

The subject matter in this disclosure describes a disconnectable fluid coupling that stops fluid flow in the event of fluid line breakage. The fluid coupling includes two tubulars that disconnect or breakaway under a pre-determined tensile force. The pre-determined tensile force is less than the shear tensile strength of any connection, such as pipes and hoses, or other components in the fluid transfer system. The isolation trigger is mechanically activated once the two coupling tubulars disconnect. The isolation trigger causes spring-powered feathers to block fluid flow by closing one or both tubulars of the coupling. The blocking of fluid flow is almost instantaneous to prevent, or at least reduce, leakage of transferred fluids to the outside environment. The components of the fluid coupling described in this disclosure, for example, the tubulars, the feathers, the spring, the trigger, the guides, and other components, are constructed to operate, without failing, in the presence of or upon contacting hazardous or flammable fluids, for example, fuel or other hydrocarbons.

Figure 1:
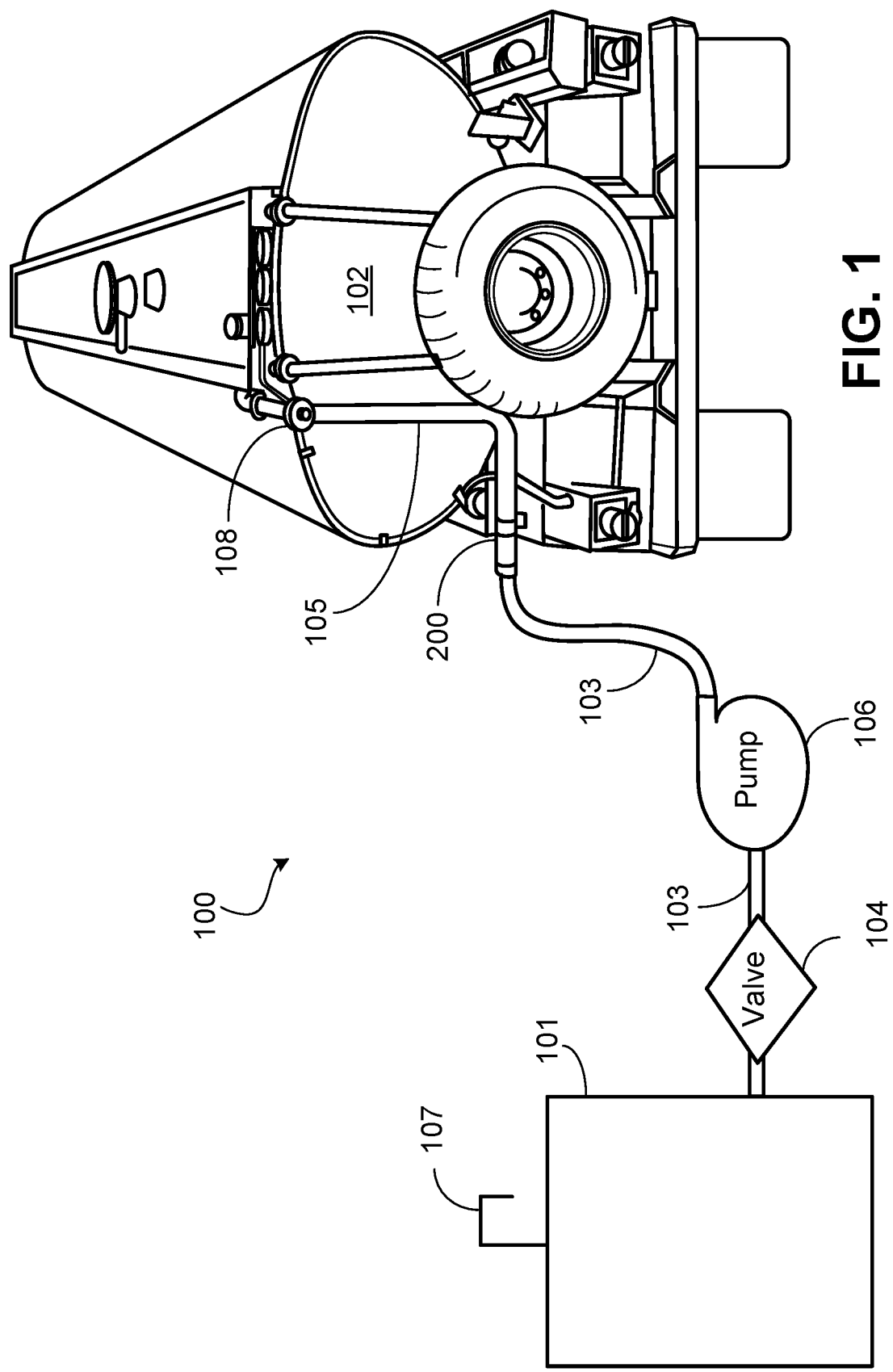
FIG. 1 is a schematic diagram of an example fluid transfer system of this disclosure.

FIG. 1 is a schematic diagram of an example fluid transfer system 100. The fluid transfer system 100 includes a first reservoir 101. The first reservoir 101 is a tank that retains a fluid. In some implementations, the first reservoir 101 is a stationary tank. The first reservoir 101 can include a vent 107 to vent vapor that may have accumulated at an uphole section of the first reservoir 101. The vent 107 also allows fluid within the tank to be removed by allowing air into the tank as the fluid is removed. In some implementations, the first fluid reservoir 101 is a pressurized storage tank, and the vent 107 is not included, or is replaced with a pressure safety valve. The fluid transfer system 100 includes a second reservoir 102. The second reservoir 102 is a tank that receives the retained fluid. In some implementations, the second reservoir 102 is a mobile tank (or tanker), mounted to a truck, train, or other transportation system. The second reservoir 102 can include a vent 108 to vent vapor that may have accumulated at an uphole section of the second reservoir 102. The vent 108 also allows fluid within the tank to be removed by allowing air into the tank as the fluid is removed. In some implementations, the second fluid reservoir 102 is a pressurized storage tank, and the vent 108 is not included, or is replaced with a pressure safety valve.

A disconnectable fluid coupling 200 connects the first reservoir 101 with the second reservoir 102. Two halves of the fluid coupling 200 are designed to shear or separate under an applied tensile force exceeding a pre-determined tensile load. The fluid coupling 200 defines at least a part of a fluid passage between the first reservoir 101 and the second reservoir 102. The fluid passage can extend from the first reservoir 101, through the fluid coupling 200, to the second reservoir 102. In some implementations, a first conduit 103 connects the first reservoir 101 with the fluid coupling 200. In some implementations, a second conduit 105 connects the fluid coupling 200 with the second reservoir 102. The first conduit 103 and second conduit 105 can be flexible hoses, pipes, or any other connection designed to handle the transferred fluid and applied tensile forces.

In some implementations, the fluid retained in the first reservoir 101 is pressurized. The pressurized fluid can flow to the second reservoir 102 once the fluid coupling 200 is connected and maintained at an open position (as described later). In some implementations, a pump 106 is located downstream from the first reservoir 101 to pump the fluid to the second reservoir 102. The pump 106 can be of any type suitable of moving fluids of the kind retained in the first reservoir 101. In some implementations, the pump 106 is a dynamic or centrifugal pump. In some implementations, the pump 106 is a positive displacement pump. A valve 104 can be installed downstream or upstream from the pump 106. The valve 104 can be a flow or pressure control valve to control fluid flow from the first reservoir 101, prevent pump cavitation, or both. The same valve-type or another valve-type can be installed downstream from the pump 106. The valve downstream from the pump 106 can be a check (or non-return) valve.

Figure 2A:
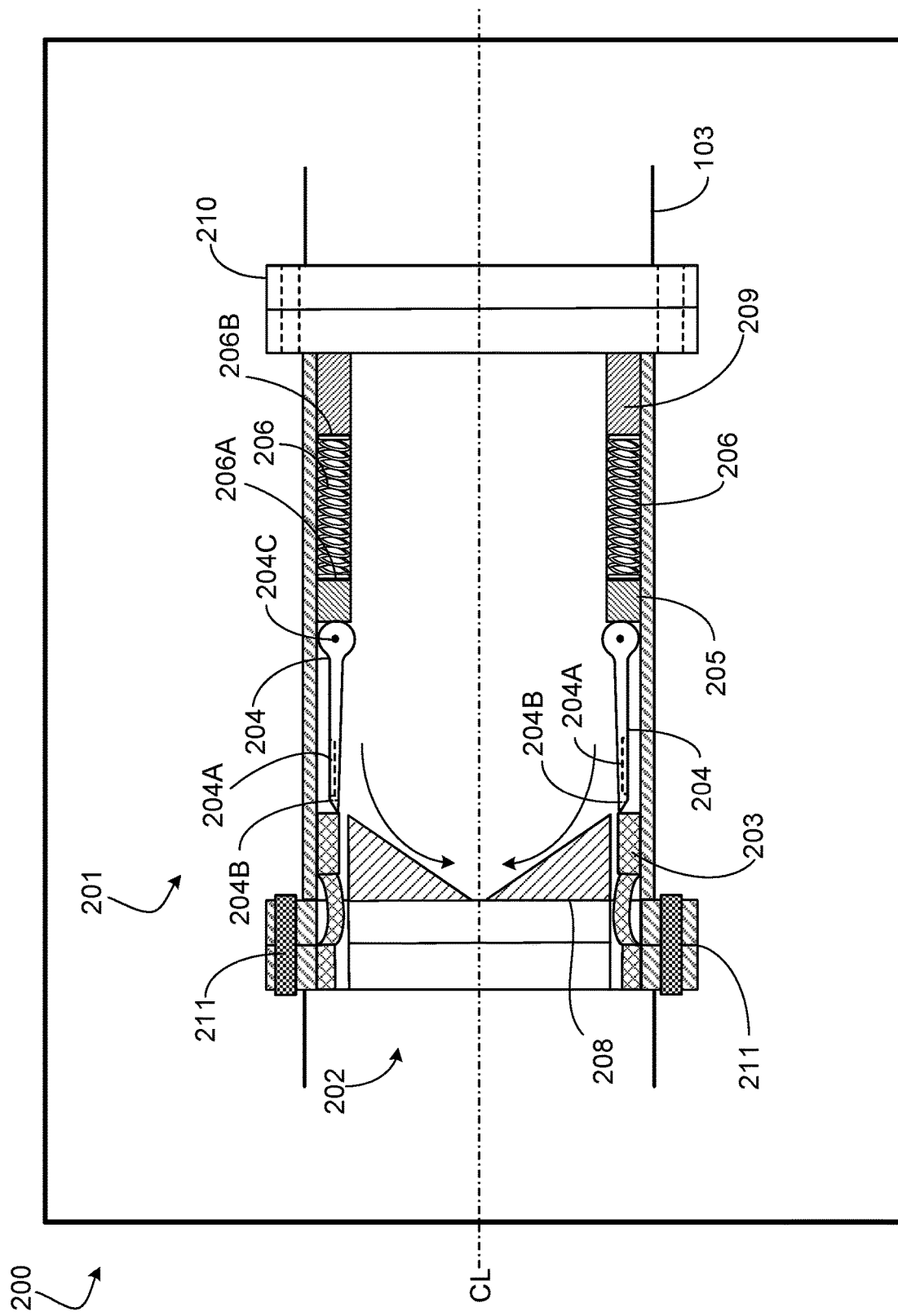
FIG. 2A is a side cross-sectional diagram of an example of an implementation of a fluid coupling of this disclosure in an open position.
Figure 2B:
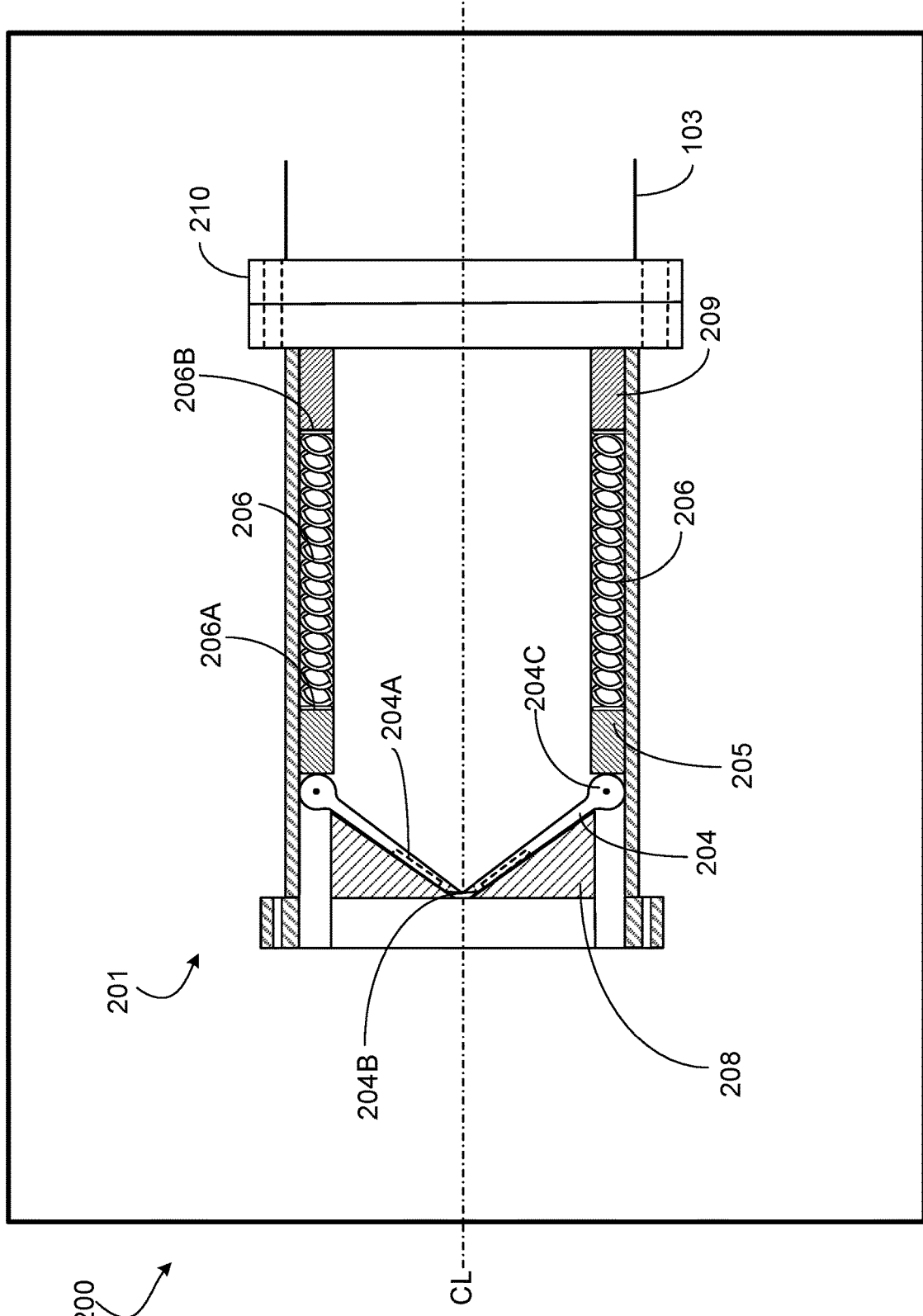
FIG. 2B is a side cross-sectional diagram of an example of an implementation of a fluid coupling of this disclosure in a closed position.
Figure 2C:
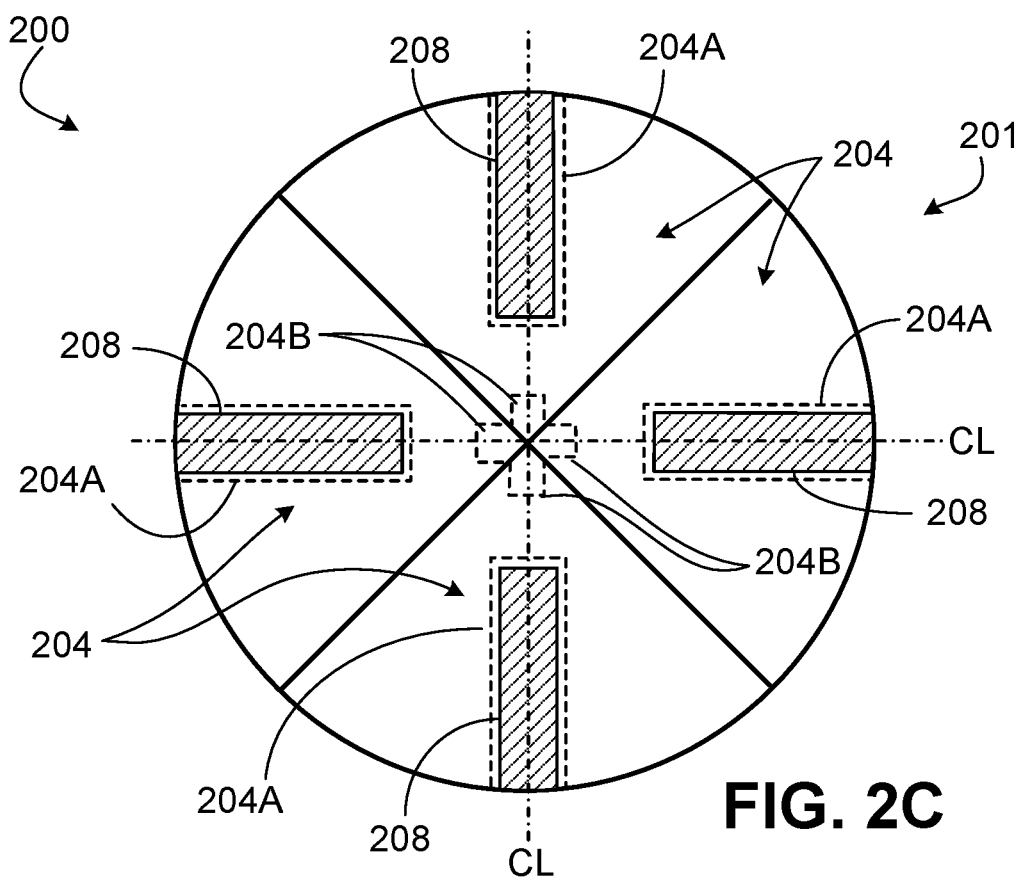
FIG. 2C is an axial-view schematic diagram of an example of an implementation of a fluid coupling of this disclosure in a closed position.
Figure 2D:
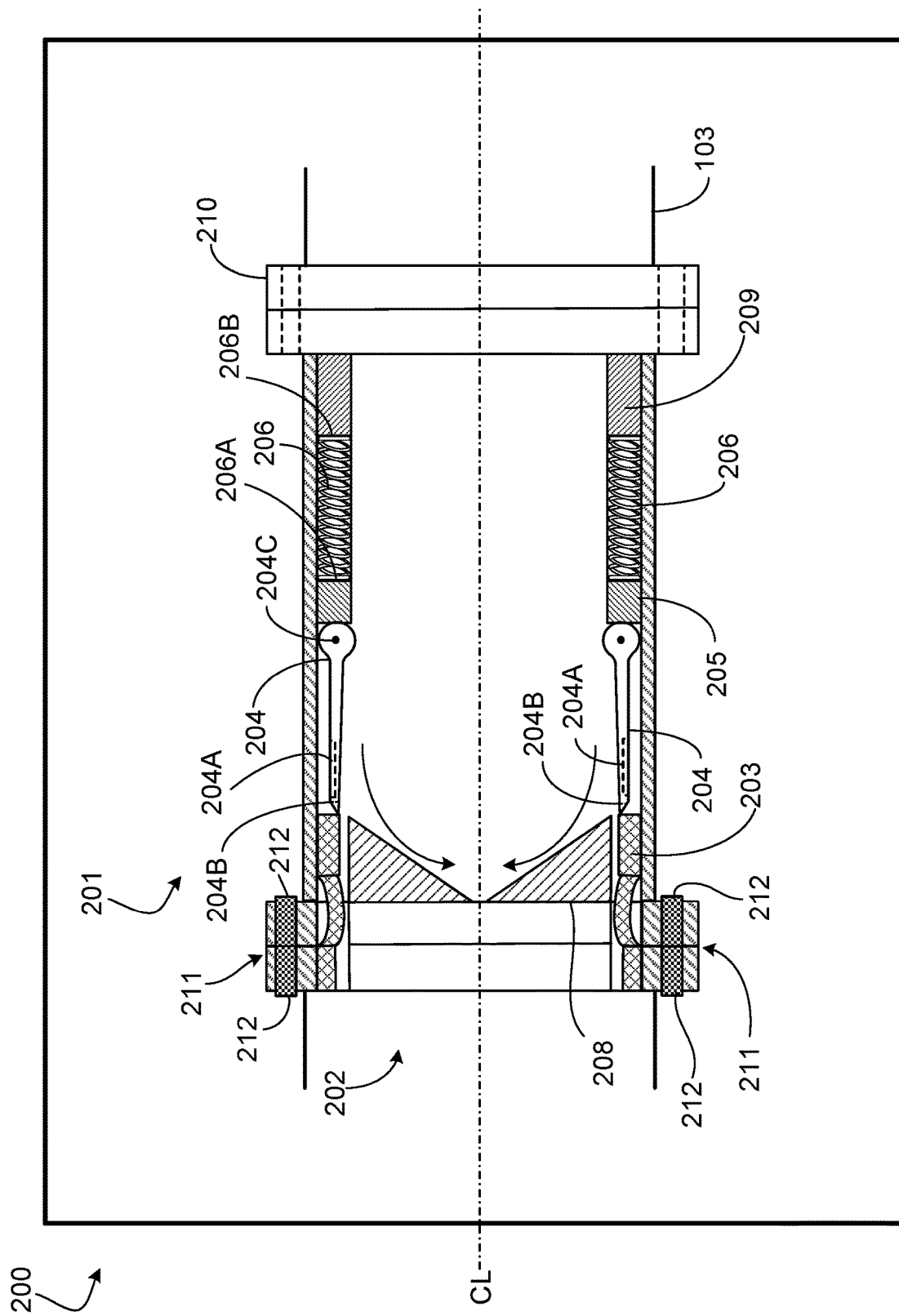
FIG. 2D is a side cross-sectional diagram of an example of an implementation of a fluid coupling of this disclosure in an open position.

FIG. 2A and FIG. 2D are side cross-sectional diagrams of an example fluid coupling 200. The fluid coupling 200 shown in FIG. 2A is in an open position. The fluid coupling 200 includes a first tubular 201. The first tubular 201 defines at least a first part of a fluid passage. The first tubular 201 is coupled to and aligned with a second tubular 202. The second tubular 202 defines at least a second part of the fluid passage. In some implementations, the fluid coupling 200 defines at least a tubular of the fluid passage between the first reservoir 101 and the second reservoir 102 of FIG. 1. In the open position, the fluid is able to flow through the fluid passage, partly defined by the fluid coupling 200, between the first reservoir 101 and second reservoir 102. The first tubular 201 and second tubular 202 can be identical in size. The first tubular 201 and second tubular 202 are sealingly coupled to prevent fluid leakage while the fluid coupling 200 is in the open position.

The first tubular 201 is coupled to the second tubular 202 via a fastener 211. In some implementations, the fastener 211 is one of several fasteners. The fastener 211 can include bolts, pins, magnets 212, or any combination. In some implementations, the fastener 211 includes shear bolts. The shear bolts have sufficient strength to hold the first tubular 201 and the second tubular 202 together under normal operating conditions. The shear bolts have sufficient strength to shear under an applied tensile load exceeding a predetermined tensile load. In some implementations, the fastener 211 includes shear pins. The shear pins have sufficient strength to hold the first tubular 201 and the second tubular 202 together under normal operating conditions. The shear pins have sufficient strength to shear under an applied tensile load exceeding the predetermined tensile load. In some implementations, the fastener 211 includes magnets 212. The magnets 212 have sufficient strength to hold the first tubular 201 and the second tubular 202 together under normal operating conditions. The magnets 212 have sufficient strength to separate under an applied tensile load exceeding the predetermined tensile load.

The first tubular 201 includes a feather 204. The feather 204 is positioned within the first tubular 201. The feather 204 is configured to axially translate towards the second tubular 202 and pivot towards a center of the first tubular 201. The feather 204 includes a hinge on a pivoting end 204C. The feather 204 has a round shape on the pivoting end 204C and a pointed shape on an opposite end. In some implementations, the feather 204 is one of several feathers. For example, one, four, eight, sixteen, or thirty-two feathers 204 can be used. The number of feathers is dependent upon the diameter of the first tubular 201 and a design flowrate through the fluid coupling 200. The feather 204 includes a groove 204A, a notch 204B, or both. The groove 204A is configured to receive a guide 208 in order to translate the feather 204 to the center of the first tubular 201. In some implementations, the groove 204A is defined by an outer surface of the feather 204. In some implementations, the groove 204A is defined by an inner surface and outer surface of the feather 204. The notch 204B is configured to receive a trigger 203 in order to maintain the feather 204 in the open position. In some implementations, the notch 204B is at a tip of the feather 204 at the opposite end of the hinge. In the closed position, the first tubular 201 is separated from the second tubular 202 and the fluid is blocked from flowing through the fluid passage by the feather 204. That is, the groove 204A and the notch 204B can be one and the same or different components.

The first tubular 201 includes a spring 206. The spring 206 has a first end 206A and a second end 206B. The first end 206A is coupled to the feather 204 and the second end 206B is coupled to the first tubular 201. In some implementations, the first end 206A abuts the feather 204. In some implementations, the second end 206B abuts a shoulder 209. The shoulder 209 is adjacent to a flanged connection 210 and is nearer a first reservoir 101 than the second reservoir 102. In the open position, the spring 206 is positioned to exert a force on the feather 204 in a direction towards the second tubular 202. The spring 206 is loaded (in open position) to be able to actuate a movement of the feather 204 between the open position and the closed position. In some implementations, the spring 206 is one of several springs. In some implementations, the spring 206 is arranged radially around an inner surface of the first tubular 201. While illustrated with the spring 206 loaded in compression, other arrangements that involve the spring 206 loaded in tension can be used without departing from this disclosure.

The first tubular 201 includes a trigger 203. In some implementations, the trigger 203 is a solid rod. For example, the trigger 203 can be made of any grade of steel or brass such that galvanic corrosion does not occur within the fluid coupling 200. The trigger has a clear tensile strength considering its design to break with specific pulling force that will be less than the required force that will cause any damage to the any other components of the fluid system. The trigger 203 abuts the feather 204. The trigger 203 is positioned in a recess defined by at least the first tubular 201 to provide an interference with the feather 204. This interference retains the feather 204 in the open position when the first tubular 201 and second tubular 202 are coupled. In some implementations, the trigger 203 is shaped to be received by the notch 204B in the feather 204. Prior to being activated, the trigger 203 is configured to retain the feather 204 in open position. The trigger 203 activates when the first tubular 201 is separated from the second tubular 202 by, for example, an external pulling force. In some implementations, the trigger 203 activates by shearing under an applied tensile load exceeding the predetermined tensile load. In some implementations, the trigger 203 is attached to the second tubular 202. The trigger 203 is displaced by the second tubular 202 when the first tubular 201 and the second tubular 202 are separated. That is, the trigger is pulled from the recess defined by the first tubular 201 when the first tubular 201 and the second tubular 202 separate. Because the trigger 203 is removed, the feather 204 is free from the interference retaining the feather 204 in the open position. Consequently, the feather 204 is translated by the spring 206 to the closed position. In some implementations, the trigger 203 is one of several triggers. In some implementations, magnetic triggers can be used with similar effect.

In some implementations, the fluid coupling 200 includes a slider 205. In some implementations, the slider 205 is a solid rod that can be made up of any grade steel that matches with other coupling components without causing galvanic corrosion. The slider 205 mechanically couples the feather 204 with the spring 206. The slider 205 abuts the pivoting end 204C of the feather 204, on one end. The slider 205 abuts the spring 206, on an opposite end. The slider 205 is configured to slide against the inner surface of the first tubular 201 when the feather 204 is moved from the open position to the closed position. In some implementations, the slider 205 is coated by a plastic coating material. In some implementations, the slider 205 is one several sliders.

In some implementations, the fluid coupling 200 includes a guide 208. The guide 208 is positioned in the fluid passage. The guide 208 is configured to guide the feather 204 from the open position to the closed position. The guide 208 has a thin profile, as illustrated by FIG. 2C, and is attached to the inner surface of the first tubular 201. The thin profile of the guide 208 is matched to the groove 204A in the feather 204 to help translate the feather 204 from the open position to the closed position. In some implementations, the guide 208 is one of several guides.

In some implementations, referring to FIG. 2A, in the open position, the first tubular 201 is coupled with the second tubular 202. In the open position, the feather 204 is retained by the trigger 203 to allow fluid flow within the fluid passage during operation. The spring 206 is loaded to keep the feather 204 abut to the trigger 203 in the open position during operation.

FIG. 2B is a side cross-sectional diagram of the example fluid coupling 200 in a closed position. In the closed position, the first tubular 201 is released from the second tubular 202. In the closed position, the feather 204 is translated to the center of the first tubular 201 to block the fluid passage by closing the first tubular 201. In some implementations, as described earlier, the feather 204 is one of several feathers. One or more of the feathers can be clad by a sealing material to be sealed against each other to prevent fluid leakage when in the closed position. In some implementations, a minor interference is calculated between the feathers so that a complete seal occurs in the closed position. For example, up to a 10% interference can be used. The interference calculations consider the full width of the feather as an addition to provide improved sealing. The movement of the feather 204 is actuated by the loaded spring 206. The spring 206 unloads to translate the feather 204 to the closed position.

FIG. 2C shows an axial view of the example fluid coupling 200 in the closed position. In some implementations, the feather 204 is one of several feathers. For example, the coupling 200 illustrated in FIG. 2C includes four feathers. Greater or fewer feathers 204 can be used without departing from this disclosure. For example, one, four, eight, sixteen, or thirty-two feathers 204 can be used. The number of feathers is dependent upon the diameter of the first tubular 201 and a design flowrate through the fluid coupling 200. The feathers 204 are able to close the first tubular 201 and block the fluid passage. In some implementations, the guide 208 is one of several guides. For example, the coupling 200 illustrated in FIG. 2C includes four guides 208. Greater or fewer guides can be used without departing from this disclosure. For example, 1 to 8 guides can be used. In some implementations, the number of guides 208 can be equal to the number of feathers 204. The guides are spaced to correspond with the spacing of the feathers in the closed position. Each guide has a thin profile and is attached to the inner surface of the first tubular 201. The profile may be as thin as possible to reduce turbulence caused by the guide 208, but thick enough to sufficiently guide, support, or both, the feather. In some implementations, the guide 208 is arranged radially around the inner surface of the first tubular 201 and extends to the center of the first tubular 201. The guide 208 has a triangular shape from a side cross-sectional view, as illustrated by FIGS. 2A-2B, and a thin line shape from an axial view, as illustrated by FIG. 2C. Although the guide 208 is positioned in the fluid passage, pressure drop, reduction in flow rate, or both, across the fluid coupling 200 is reduced in comparison to a traditional coupling, due to the thin profile design of the guide 208.

Figure 3:
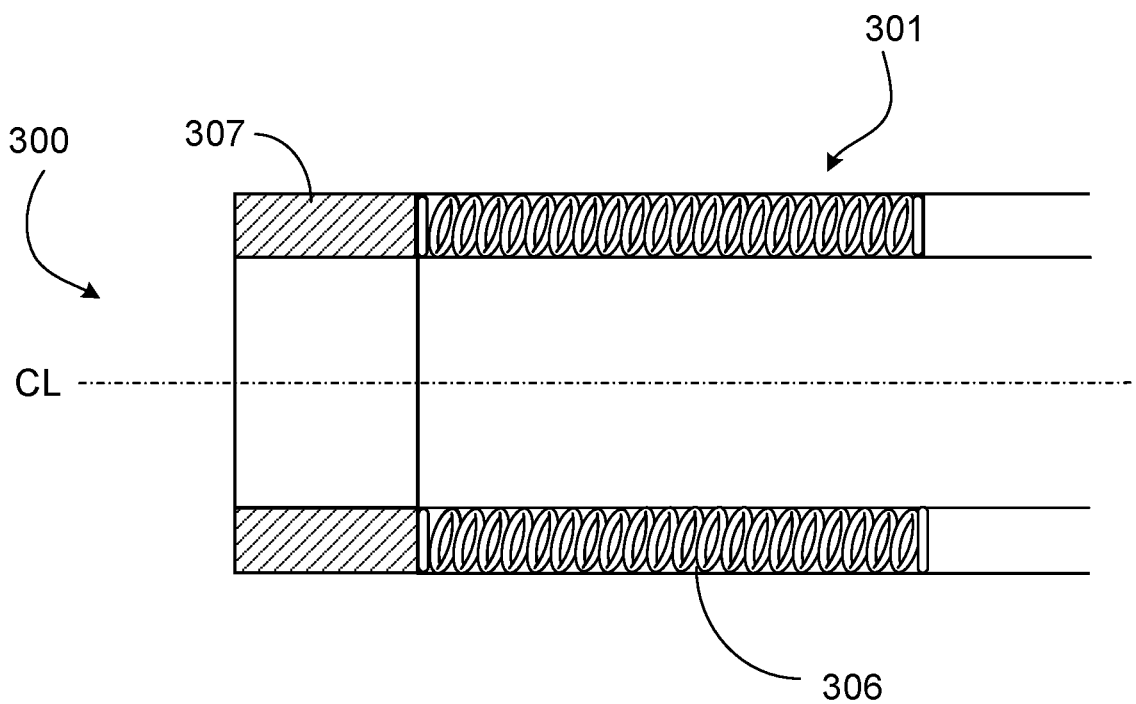
FIG. 3 is a side cross-sectional diagram of an example of an implementation of a fluid coupling of this disclosure.
Figure 4:
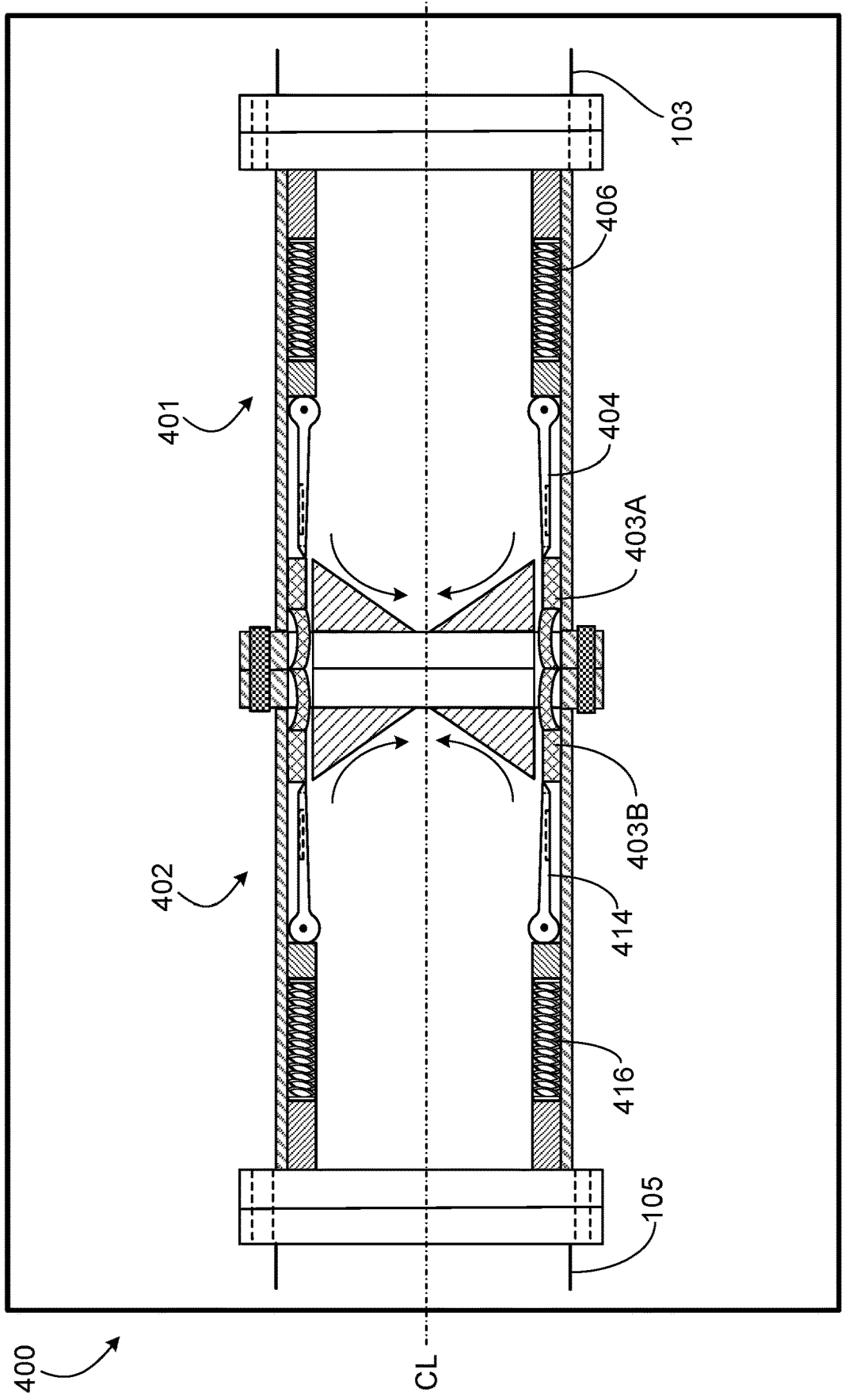
FIG. 4 is a side cross-sectional diagram of an example of an implementation of a fluid coupling of this disclosure.

Other implementations are contemplated, as illustrated by FIGS. 3-4. FIG. 3 is a side cross-sectional diagram of an example of an implementation of a fluid coupling 300. The fluid coupling 300 is substantially similar to the fluid coupling 200 of FIGS. 2A-2C, with the exception of any differences described herein. For example, the fluid coupling 300 includes a first tubular 301. The first tubular 301 is substantially similar to the first tubular 201, except that the latter does not include a common ring 307. The common ring 307 is connected to a spring 306. In some implementations, the spring 306 includes one spring. In some implementations, the spring 306 is one of several springs acting in unison. The common ring 307 is positioned to transfer a spring force of the spring 306 to a feather (not shown). The spring 306 is positioned to exert a force on the common ring 307 towards the feather.

FIG. 4 shows an example of an implementation of a fluid coupling 400. The fluid coupling 400 is substantially similar to fluid coupling 200 or fluid coupling 300, except that the first tubular 401 is substantially similar or identical to the second tubular 402. For example, feather 404 is substantially similar or identical to feather 414, except that they are facing opposite directions. For example, spring 406 is substantially similar or identical to spring 416, except that they are facing opposite directions. In some implementations, the feather 404 and feather 414 include the same number of feathers. In some implementations, the feather 404 and feather 414 include different number of feathers. In some implementations, the spring 406 and spring 416 include the same number of springs. In some implementations, the spring 406 and spring 416 include different number of springs. In some implementations, a trigger 403 can be common between the first tubular 401 and the second tubular 402. In some implementations, the trigger 403 can be different. For example, trigger 403A is positioned within the first tubular 401 and trigger 403B is positioned within the second tubular 402. This implementation prevents leakage of the transferred fluid from both the first conduit 103 and second conduit 105 (or the first reservoir 101 and second reservoir 102) connected to the fluid coupling 400. In the closed position, the feather 414 is able to close the second tubular 402 and, thus, block fluid flow coming back from the second conduit 105 or second reservoir 102.

Figure 5:
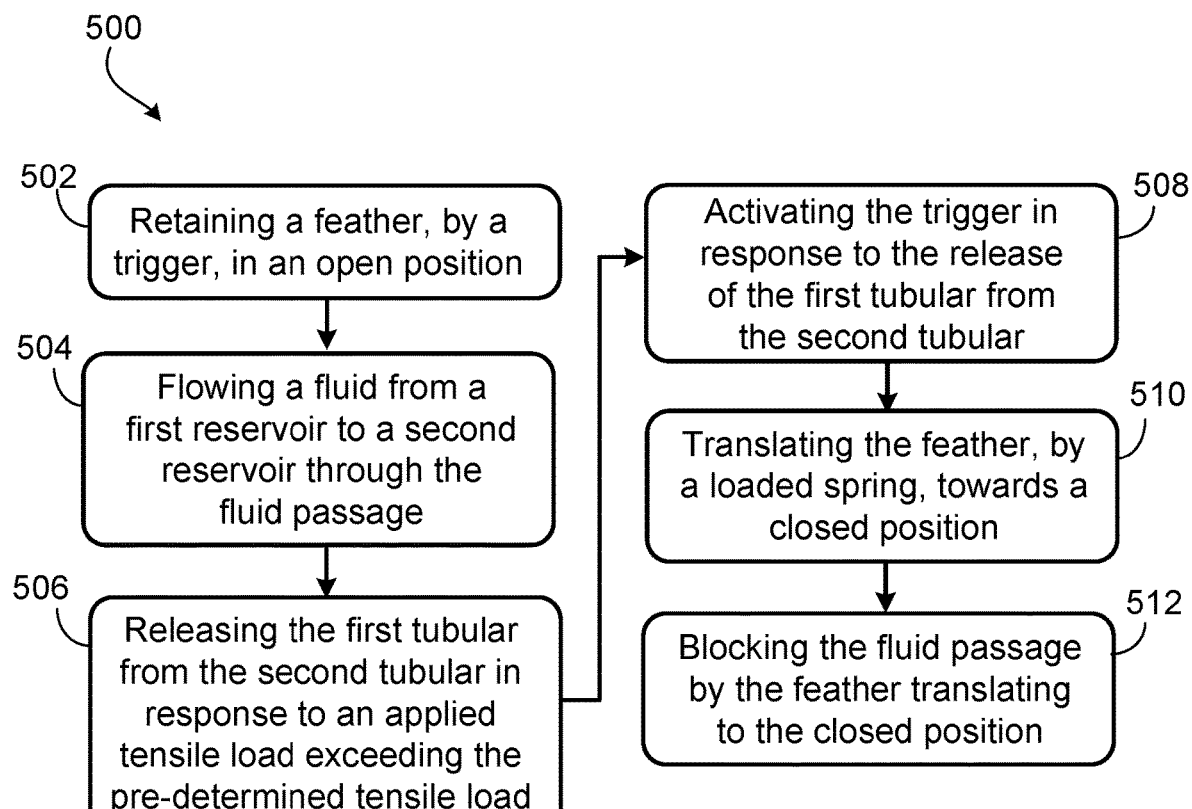
FIG. 5 is a flowchart of an example method that can be used with aspects of this disclosure.

FIG. 5 shows a flowchart of an example method 500 of how an example fluid transfer system 100 works. Details of this method 500 are described in the context of FIGS. 1-4. A fluid coupling, for example, fluid coupling 200 or fluid coupling 300, of the fluid transfer system 100 is installed between a first reservoir 101 and a second reservoir 102.

At 502, a feather 204 of the fluid coupling is retained by a trigger 203 in an open position. The open position allows fluid flow through a fluid passage defined by a first tubular 201 and a second tubular 202. The first tubular 201 is axially coupled to and aligned with the second tubular 202. The feather 204 is positioned within the first tubular 201. The first tubular 201 and the second tubular 202 are separable under a pre-determined tensile load. In some implementations, the feather 204 abuts a loaded spring 206 while in the open position during operation. The trigger 203 keeps the spring 206 loaded by maintaining the feather 204 in the open position.

At 504, the fluid flows from the first reservoir 101 to the second reservoir 102 through the fluid passage. In some implementations, the fluid flows from a pressurized first reservoir 101. In some implementations, the fluid is pumped by a pump 106 upstream from the fluid coupling 200 and downstream from the first reservoir 101.

At 506, the first tubular 201 is released from the second tubular 202 in response to an applied tensile load that exceeds the pre-determined tensile load. For example, the first tubular 201 and the second tubular 202 can be separated by an external pulling force. The pre-determined tensile is determined such that the first tubular 201 and the second tubular 202 separate prior to other fluid components experiencing plastic deformation.

At 508, the trigger 203 is activated in response to the release of the first tubular 201 from the second tubular 202. The trigger 203 provides an interference with the feather 204 to retain the feather 204 in the open position under normal operating conditions. In the open position, the feather 204 keeps the spring 206 loaded. Once the trigger 203 is activated, the interference is removed. In some implementations, the trigger 203 is activated by being sheared. In some implementations, the trigger 203 is attached to the second tubular 202. The trigger 203 is displaced by the second tubular 202 when the first tubular 201 and the second tubular 202 are separated. The spring 206 unloads in response to the removed interference. The feather 204 is actuated from the open position to a closed position by the unloaded spring 206.

At 510, the feather 204 is translated, by the loaded spring 206, towards the closed position. In some implementations, a guide 208 guides the feather 204 to a center of the first tubular 201 in a direction towards the second tubular 202. The guide 208 has a thin profile attached to an inner surface of the first tubular 201. The thin profile of the guide 208 is matched to a groove 204A in the feather 204. In some implementations, the groove 204A is defined by an outer surface of the feather 204. In some implementations, the groove 204A is defined by an inner surface and outer surface of the feather 204.

At 512, the fluid passage is blocked by the feather 204 in the closed position. The transition to the closed position, occurs when the first tubular 201 is separated from the second tubular 202. As a result, the feather 204 translates to the center of the first tubular 201, towards the second tubular 202. The feather 204 translates to the center of the first tubular 201 by movement of the unloaded spring 206. The spring 206 actuates movement of the feather 204 from the open position to the closed position. Once in the closed position, the feather 204 blocks fluid flowing through the fluid passage by closing the first tubular 201.

While this disclosure contains many specific implementation details, these should not be construed as limitations on the scope of any inventions or of what may be claimed, but rather as descriptions of features specific to particular implementations of particular inventions. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the implementations described above should not be understood as requiring such separation in all implementations, and it should be understood that the described components and systems can generally be integrated together in a single product or packaged into multiple products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A fluid coupling comprising:
   a first tubular defining at least a first part of a fluid passage;
   a second tubular coupled to and aligned with the first tubular, the second tubular defining at least a second part of the fluid passage;
   a feather positioned within the first tubular, the feather configured to axially translate towards the second tubular and pivot towards a center of the first tubular, the feather comprising a hinge on a pivoting end, the feather having a round shape on the pivoting end and a pointed shape on an opposite end;
   a spring having a first end and a second end, the first end coupled to the feather and the second end coupled to the first tubular, the spring being loaded to actuate a movement of the feather between an open position and a closed position; and
   a trigger abut to the feather, the trigger positioned between the first tubular and the second tubular to provide an interference with the feather, the interference retaining the feather in the open position when the first tubular and second tubular are coupled.

2. The fluid coupling of claim 1, wherein the feather is one of a plurality of feathers, each of the plurality of feathers having a groove along an inner surface of the feather.

3. The fluid coupling of claim 1, wherein the trigger is shaped to receive a groove in the feather.

4. The fluid coupling of claim 1, further comprising a slider mechanically coupling the feather with the spring, the slider attached to the hinge of the feather on the pivoting end, and to the spring on an opposite end, the slider configured to slide against an inner surface of the first tubular.

5. The fluid coupling of claim 1, wherein the fluid coupling defines at least a portion of the fluid passage between a first reservoir and a second reservoir.

6. The fluid coupling of claim 5, wherein the spring is arranged radially around an inner surface of the first tubular, the first end abuts the feather and directs the feather towards the second tubular, the second end includes a shoulder and is nearer the first reservoir than the second reservoir, the spring positioned to exert a force on the feather in a direction towards the second tubular.

7. The fluid coupling of claim 1, wherein the first tubular is coupled to the second tubular via shear bolts, the shear bolts having sufficient strength to hold the first tubular and the second tubular together under normal operating conditions, the bolts having a strength to shear under an applied tensile load exceeding a predetermined tensile load.

8. The fluid coupling of claim 1, wherein the first tubular is coupled to the second tubular via shear pins, the shear pins having sufficient strength to hold the first tubular and the second tubular together under normal operating conditions, the pins having a strength to shear under an applied tensile load exceeding a predetermined tensile load.

9. The fluid coupling of claim 1, wherein the first tubular is coupled to the second tubular via magnets, the magnets having sufficient strength to hold the first tubular and the second tubular together under normal operating conditions, the magnets having a strength to separate under a predetermined tensile load.

10. The fluid coupling of claim 1, further comprising a guide positioned in the fluid passage defined by the first tubular and second tubular, the guide having a thin profile attached to an inner surface of the first tubular, the guide configured to guide the feather from the open position to the closed position, the thin profile of the guide matched to a groove in the feather.

11. The fluid coupling of claim 10, wherein the open position is when the first tubular is joined with the second tubular, the feather is retained by the trigger to allow fluid flow within the fluid passage during operation.

12. The fluid coupling of claim 11, wherein the spring is loaded to keep the feather abut to the trigger in the open position during operation.

13. The fluid coupling of claim 12, wherein the spring unloads to actuate movement of the feather to the closed position.

14. The fluid coupling of claim 10, wherein the closed position comprises the first tubular being released from the second tubular, wherein the feather has translated to block the fluid passage by closing the first tubular.

15. The fluid coupling of claim 1, wherein the spring comprises one spring connected to a common ring, the common ring positioned to transfer a spring force to the feather.

16. The fluid coupling of claim 1, wherein the first tubular is substantially identical to the second tubular, the feather is a first feather, the fluid coupling further comprising:
   a second feather positioned within the second tubular, the second feather configured to axially translate towards the first tubular and pivot towards a center of the second tubular, the second feather having a round shape on a second pivoting end and a pointed shape on a second opposite end, the second feather having a groove along an inner surface of the second feather.

17. The fluid coupling of claim 1, wherein the trigger comprises a solid rod.

18. The fluid coupling of claim 1, wherein the feather is cladded by a sealing material.

19. A method comprising:
   retaining a feather, by a trigger, in an open position, the open position allowing fluid flow through a fluid passage defined by a first tubular and a second tubular, the first tubular axially coupled to the second tubular, the first tubular is aligned with the second tubular, the feather positioned within the first tubular, the first tubular and the second tubular being separable under a pre-determined tensile load;

flowing a fluid from a first reservoir to a second reservoir through the fluid passage;
releasing the first tubular from the second tubular in response to an applied tensile load exceeding the predetermined tensile load;
activating the trigger in response to the release of the first tubular from the second tubular;
translating the feather, by a loaded spring, towards a closed position;
guiding, by a guide, the feather from the open position to the closed position, the guide having a thin profile attached to an inner surface of the first tubular, the thin profile of the guides matched to a groove in an inner surface of the feather; and
blocking the fluid passage, by the feather translating to the closed position.

20. The method of claim 19, further comprising retaining the feather, by the loaded spring, in the open position during operation.

21. The method of claim 19, further comprising, in response to releasing the first tubular from the second tubular, actuating the feather from the open position to the closed position by unloading the loaded spring.

22. A fluid transfer system comprising:
a first reservoir configured to retain a fluid;
a second reservoir configured to receive the retained fluid;
a fluid coupling defining at least a part of a fluid passage between the first reservoir and second reservoir, the fluid coupling comprising:
  a first tubular axially coupled to a second tubular, the first tubular is aligned with the second tubular to define the fluid passage;
  a feather positioned within the first tubular, the feather configured to axially translate towards the second tubular and pivot towards a center of the first tubular;
  a spring attached to the feather, the spring configured to actuate a movement of the feather between an open position and a closed position; and
  a trigger attached to the feather, the trigger positioned between the first tubular and the second tubular, the trigger configured to retain the feather in the open position when the first tubular and second tubular are coupled.

* * * * *